(12) United States Patent
McNamara et al.

(10) Patent No.: US 11,587,690 B2
(45) Date of Patent: Feb. 21, 2023

(54) MACHINE LEARNING IN FUSION REACTORS

(71) Applicant: Tokamak Energy Ltd., Abingdon (GB)

(72) Inventors: Steven Antony Milton McNamara, London (GB); Peter Buxton, Abingdon (GB); David Kingham, Oxford (GB)

(73) Assignee: Tokamak Energy Ltd., Abingdon (GB)

( * ) Notice: Subject to any disclaimer, the term of this patent is extended or adjusted under 35 U.S.C. 154(b) by 0 days.

(21) Appl. No.: 16/627,599

(22) PCT Filed: Jul. 4, 2018

(86) PCT No.: PCT/GB2018/051874
§ 371 (c)(1),
(2) Date: Dec. 30, 2019

(87) PCT Pub. No.: WO2019/008349
PCT Pub. Date: Jan. 10, 2019

(65) Prior Publication Data
US 2020/0168352 A1 May 28, 2020

(30) Foreign Application Priority Data

Jul. 6, 2017 (GB) ..................... 1710889

(51) Int. Cl.
*G21D 3/00* (2006.01)
*G05B 13/02* (2006.01)
(Continued)

(52) U.S. Cl.
CPC ......... *G21D 3/001* (2013.01); *G05B 13/0265* (2013.01); *G21B 1/057* (2013.01);
(Continued)

(58) Field of Classification Search
CPC . G21D 3/001; G21D 3/08; G21D 3/10; G05B 13/0265; G21B 1/057; G21B 1/00; Y02E 30/00; Y02E 30/10; Y02E 30/30
(Continued)

(56) References Cited

U.S. PATENT DOCUMENTS

2017/0358371 A1\* 12/2017 Wong ................. H05H 1/12
2018/0174073 A1\* 6/2018 Levy ................. G06K 9/6268

FOREIGN PATENT DOCUMENTS

JP  H06109882 A  4/1994
KR  20130075411 A  7/2013

OTHER PUBLICATIONS

Hernandez J.V., Vannucci A., Tajima T., Lin Z., Horton W. and McCool S.C. 1996 Nucl. Fusion 36 1009 (Year: 1996).\*
(Continued)

*Primary Examiner* — Darlene M Ritchie
(74) *Attorney, Agent, or Firm* — Michael Best & Friedrich LLP

(57) ABSTRACT

A method of controlling a plasma in a nuclear fusion reactor. The nuclear fusion reactor comprises sensors and plasma control inputs. An initial control model is provided, relating readings of at least a subset of the sensors to control of the plasma control inputs. A control loop is performed, comprising: operating the plasma control inputs in dependence upon the sensors according to the control model; determining correlations between readings of each of the sensors, and/or between readings of the sensors and states of the plasma control inputs; and adjusting the control model based on the determined correlations.

12 Claims, 2 Drawing Sheets

(51) Int. Cl.
    *G21B 1/05*  (2006.01)
    *G21D 3/08*  (2006.01)
    *G21D 3/10*  (2006.01)
(52) U.S. Cl.
    CPC ............... *G21D 3/08* (2013.01); *G21D 3/10* (2013.01); *Y02E 30/10* (2013.01)
(58) Field of Classification Search
    USPC .................................................. 376/100–152
    See application file for complete search history.

(56) References Cited

OTHER PUBLICATIONS

Wroblewski D., Jahns G.L. and Leuer J.A. 1997 Nucl. Fusion 37 725 (Year: 1997).*
Yoshino R. 2005 Nucl. Fusion 45 1232 (Year: 2005).*
Mehranbod, N., Soroush, M., & Panjapornpon, C. (2005). A method of sensor fault detection and identification. Journal of Process Control, 15(3), 321-339 (hereinafter "Mehranbod") (Year: 2005).*
Parsons, M. S. (2017). Interpretation of machine-learning-based disruption models for plasma control. Plasma Physics and Controlled Fusion, 59(8), 085001. (Year: 2017).*
Zheng, W., Hu, F. R., Zhang, M., Chen, Z. Y., Zhao, X. Q., Wang, X. L., . . . & J-TEXT team. (2018). Hybrid neural network for density limit disruption prediction and avoidance on J-TEXT tokamak. Nuclear Fusion, 58(5), 056016. (Year: 2018).*
International Search Report with Written Opinion for related Application No. PCT/GB2018051874 dated Sep. 14, 2018 (15 Pages).
International Preliminary Report on Patentability for related Application No. PCT/GB2018051874 dated Jan. 16, 2020 (12 Pages).
Search Report issued from the United Kingdom Patent Office for related Application No. GB1710889.5 dated Jan. 9, 2018 (4 Pages).
Sengupta et al., "Modified neural networks for rapid recovery of tokamak plasma parameters for real time control", Review of Scientific Instruments, US vol. 73. No. 7., Jul. 1, 2002, pp. 2566-2577.
Felici et al., "Real-time physics-model-based simulation of the current density profile in tokamak plasmas", Nuclear Fusion, Publishing Section, Vienna, AT, vol. 51, No. Aug. 8, 2011.
Parsons, "Interpretation of machine-learning-based disruption models for plasma control", Plasma Physics and Controlled Fusion, IOP, Bristol, GB, vol. 59, No. 8, Jun. 5, 2017, p. 85001.
Landreman, "An improved current potential method for fast computation of stellarator coil shapes", arxiv.org, Cornell University Library, 201 Olin Library Cornell University Ithaca, NY 14853. Sep. 14, 2016.
Murari et al., "Innovative signal processing and data analysis methods on JET for control in the perspective of next-step devices", IOP Publishing and International Atomic Energy Agency Nucl. Fusion 50, May 4, 2010.
Japanese Patent Office Action for Application No. JP2019572115 dated May 10, 2022 (11 pages including English translation).

\* cited by examiner

MACHINE LEARNING IN FUSION REACTORS

FIELD OF THE INVENTION

The present invention relates to the field of fusion reactors. In particular the invention relates to the design and control of fusion reactors.

BACKGROUND

The design and operation of magnetic confinement devices for plasma (e.g. tokamaks) is a well understood field. However, when the plasma vessels are to be used as part of a fusion reactor, several additional complexities are introduced.

Firstly, in order to obtain the high plasma temperatures, densities, and confinement required for fusion, many complex systems and processes must be integrated. These processes and systems often have conflicting requirements (e.g. the desire to have the poloidal field coils used for plasma startup close to the plasma to increase the field achieved vs the desire to move components away from the plasma to reduce damage and contamination). This means that there is no universally optimal solution, but some solutions can still be better or worse than others, so design is often a matter of finding the "local maxima" which correspond to the desired outcome. The effort required to design a fusion reactor means that a skilled team of designers can only explore a small subset of the possible solutions.

Secondly, a fusion reactor is a much more hostile environment than an experimental non-fusion plasma chamber. The neutrons emitted by the fusing plasma will gradually degrade components such as sensors and cause them to fail and become inaccurate. Even working sensors will experience significant noise due to the neutron flux. In particular, the sensors used for plasma control tend to be sensitive, close to the plasma, and fragile in comparison to other sensors used to monitor the reactor (e.g. structural sensors to monitor stresses, or temperature sensors in the superconducting magnets). Some sensors (e.g. magnetic probes) record the time derivative of the desired signal, so their output must be integrated. This means that the errors in such sensors build up significantly over the pulse times which are relevant for fusion reactor operation.

SUMMARY

According to a first aspect of the invention, there is provided a method of controlling a plasma in a nuclear fusion reactor. The nuclear fusion reactor comprises sensors and plasma control inputs. An initial control model is provided, relating readings of at least a subset of the sensors to control of the plasma control inputs. A control loop is performed, comprising:
  operating the plasma control inputs in dependence upon the sensors according to the control model;
  determining correlations between readings of each of the sensors, and/or between readings of the sensors and states of the plasma control inputs; and
  adjusting the control model based on the determined correlations.

According to a second aspect, there is provided a controller for a nuclear fusion reactor, the controller being configured to interface with sensors and plasma control inputs of the nuclear fusion reactor, and to perform a method according to the first aspect.

According to a third aspect, there is provided a computer program which, when run on a controller for a nuclear fusion reactor, causes the controller to perform a method according to the first aspect.

According to a fourth aspect, there is provided a method of designing a nuclear fusion reactor. An initial set of parameters is determined for the nuclear fusion reactor. The performance of the nuclear fusion reactor is simulated. The determined parameters are varied on the basis of results of the simulation. The steps of simulating and varying the parameters are repeated in order to approach a desired simulation result.

Further embodiments are set out in claim 2 et seq.

DETAILED DESCRIPTION

Figure 1:
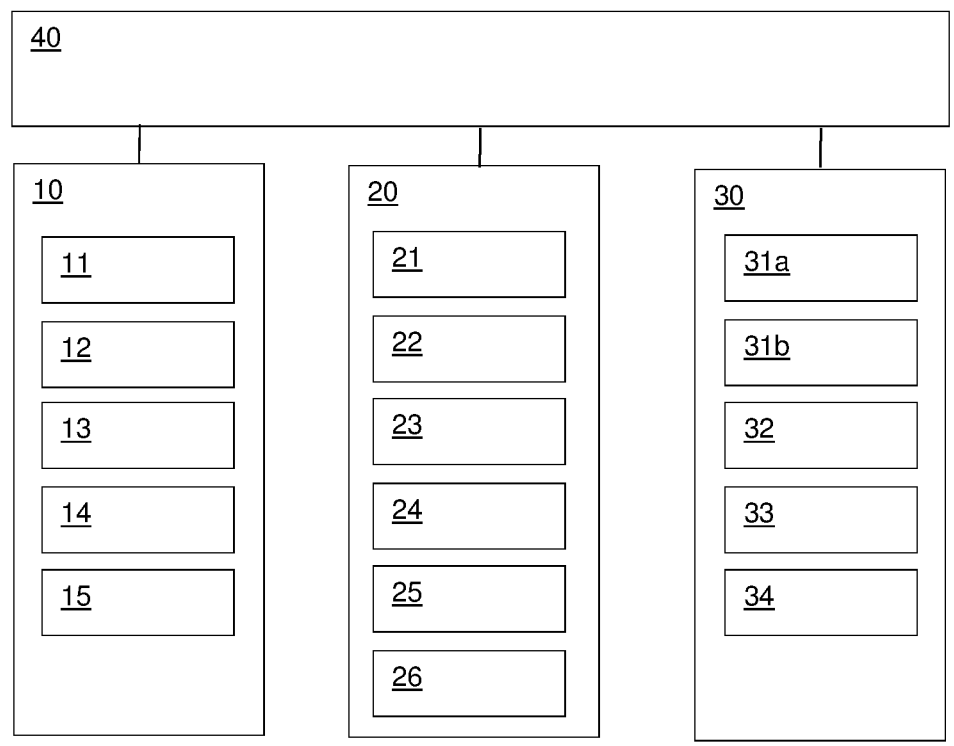
FIG. 1 is a schematic illustration of a control system for a nuclear fusion reactor.

Given the significant challenges in designing fusion reactors, with many interrelated systems and components each of which needs to be optimised given conflicting requirements, machine learning is a promising tool to aid in the design. A learning algorithm could be applied to the various parameters in fusion design and coupled to a simulation tool to determine the effects of variations of those parameters on the characteristics of the plasma and the reactor. Such an algorithm could be used to quickly and automatically explore a large parameter space to discover promising reactor designs, or could be used to optimise around a pre-existing design point (obtained either by human designers or by a broader machine learning design).

As fusion devices approach commercial deployment, the level of complexity required in the design is likely to increase significantly, as will the optimisation needed (e.g. to go above break-even on energy production and ensure a long lifecycle for the reactor). New systems will be needed, such as tritium breeding blankets, which are absent from current experimental prototypes. A machine learning approach to design could greatly increase the efficiency of designing a fusion reactor and potentially find solutions uncoverable by simple trial and error.

Machine learning can also be applied to the operation of a reactor. As noted in the background, the sensors typically used to monitor plasma within a plasma vessel ("primary sensors") are relatively fragile and prone to failure when subjected to prolonged neutron flux. However, a fusion reactor also comprises several more sturdy sensors for monitoring other aspects of the reactor ("secondary sensors")—e.g. to detect structural stresses and strains, temperature of the superconducting magnets, noise, and neutron flux. The secondary sensors are not used to monitor the state of the plasma in current designs, as there is no simple relationship between the readings of these sensors and the state of the plasma.

Using a machine learning approach, it would be possible to train a control system during the initial period of reactor operation, such that when primary sensors inevitably fail or degrade the control system can determine the state of the plasma from the secondary sensors and the primary sensors which are still active. Machine learning approaches are particularly relevant here, as the actual sensors used are likely to vary between reactors—both due to primary sensors failing at different rates on different machines, and due to small deviations in manufacturing resulting in differences in the relationships between the plasma state and the secondary sensors.

In order to ensure that the training period is sufficiently long to allow accurate control of the plasma after some or all of the primary sensors have failed, the reactor may be initially operated in a "training mode", i.e. in a mode which produces lower neutron fluxes and/or lower energy neutrons. The training mode may be achieved by starting the reactor with a deuterium only plasma, and only introducing tritium when transitioning from the training mode to normal operation.

The inputs which can be used to control the plasma system (e.g. external heating and current drive, position control coils, fuelling systems, disruption control systems) often affect the plasma in a non-linear way which is coupled to other inputs. The machine learning approach, even before any of the sensors fail, will provide significant advantages in discovering the optimal ways to control these inputs to achieve the desired plasma states. This is particularly important in a high gain burning plasma (as desired for fusion power generation) where the external energy inputs are a relatively small proportion of the energy of the plasma, and so have a relatively small effect compared to non-burning plasmas. Determining the optimal way of using the various inputs may allow access to more advanced operating regimes and improve the overall device efficiency significantly.

FIG. 1 shows a schematic illustration of a fusion reactor control system. The reactor control system comprises primary sensors 10, which are configured to monitor the state of the plasma. The primary sensors 10 may comprise magnetic diagnostics 11, spectroscopic instruments 12, optical sensors 13, bolometric systems 14, microwave diagnostics 15, or other suitable sensors. The reactor control system further comprises secondary sensors 20, which are configured to monitor other properties of the reactor. The secondary sensors 20 may comprise stress sensors 21, strain sensors 22, microphones 23, temperature sensors 24, neutron detectors 25, vibration sensors 26, or other suitable sensors. The reactor control system further comprises plasma control inputs 30, which are configured to adjust the properties of the plasma, e.g. position, temperature and current. The plasma control inputs 30 may comprise inputs for magnetic field coils 31 (including both toroidal field coils 31a and poloidal field coils 31b in the case where the reactor is a tokamak), heating systems 32, current drive systems 33, fuel inputs 34 and other suitable inputs. Heating and current drive can be achieved by neural beams with a wide range of energy, intensity and direction and/or by electromagnetic radiation with a wide range of different techniques.

The reactor control system further comprises a controller 40, which receives readings from the primary sensors 10 and the secondary sensors 20, and controls the plasma control inputs 30 on the basis of those readings in order to maintain the plasma in a desired state. The controller 40 is governed by a machine learning algorithm which is trained using the readings from the primary sensors 10, and configured such that when one or more of the primary sensors 10 fail, the controller can control the plasma on the basis of readings from the remaining primary sensors 10 and the secondary sensors 20.

Figure 2:
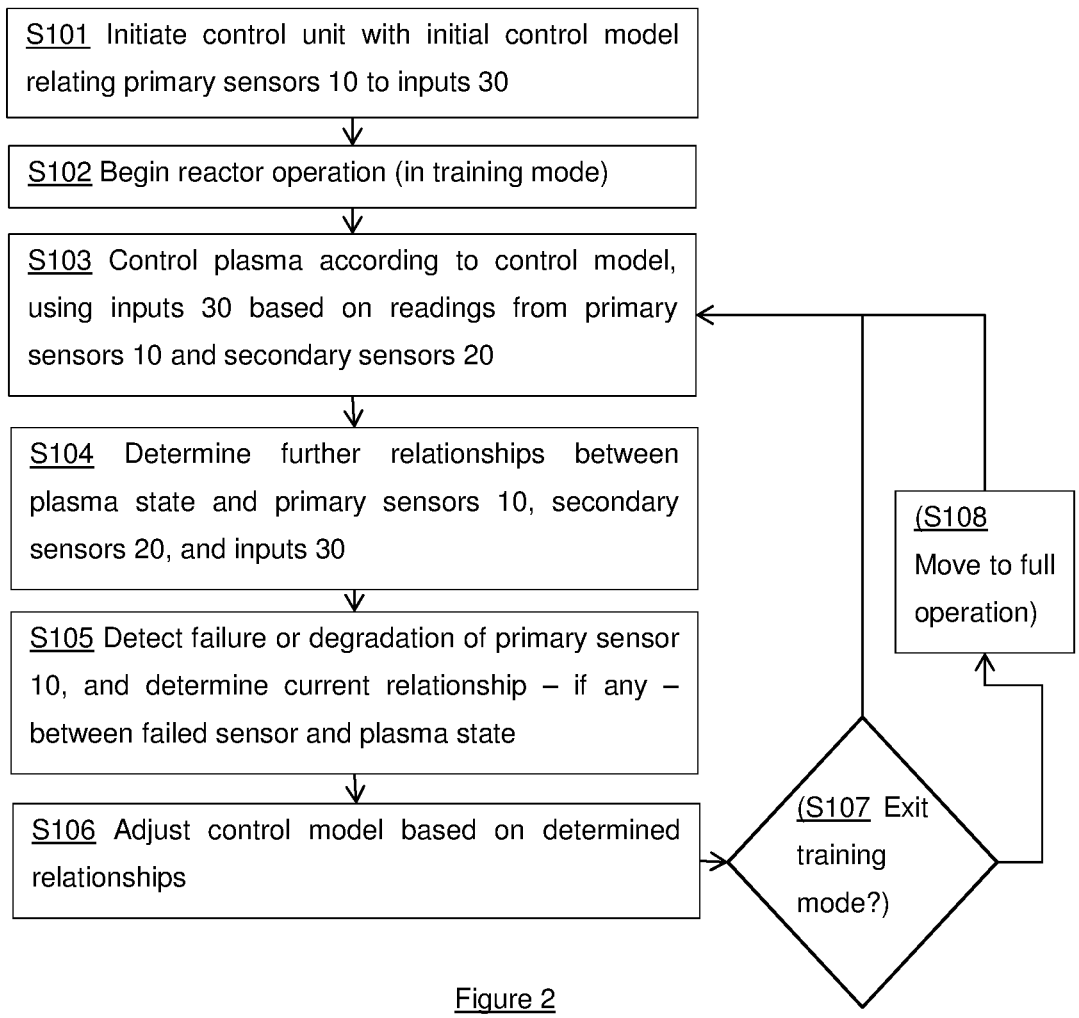
FIG. 2 is a simplified flowchart of an exemplary machine learning algorithm.

FIG. 2 shows a flowchart of an exemplary machine learning algorithm to run on the controller 10, presented in a highly simplified form. Features in brackets are optional and relate to the use of a training mode, as described above.

In step S101 the controller is initiated with an initial control model. The initial control model defines how the plasma control inputs 30 should be operated on the basis of readings from the primary sensors 10.

In step S102, the reactor begins operating (optionally in a training mode, with a lower neutron flux).

In step S103, the plasma is controlled according to the control model. The plasma is controlled using plasma control inputs 30, on the basis of readings from the primary sensors 10 and/or the secondary sensors 20. While the control model is the initial control model, only the primary sensors 10 will be used.

In step S104, the controller determines further relationships between the plasma state and the primary sensors 10, secondary sensors 20, and/or plasma control inputs 30. This may include determining correlations between the action of the plasma control inputs 30 and the readings of any one or more of the primary sensors 10 and secondary sensors 20, and/or determining correlations between any set of the primary sensors 10 and the secondary sensors 20. As an example, it may be found that readings from a particular magnetic field sensor (a primary sensor 10) and a particular strain sensor (a secondary sensor 20) are strongly correlated.

In step S105, a failure or degradation of a primary sensor 10 is detected. This failure may be detected by detecting an obviously erroneous reading of the primary sensor 10 (e.g. one which would not be physically possible given the readings of other primary sensors 10 and/or secondary sensors). The relationship between the readings of the failed sensor and the plasma state (i.e. the correlation between the readings of the failed sensor and the readings of other sensors) is determined if possible—or it may be determined that no useful correlation exists (e.g. if the sensor is not providing any readings, or is providing readings dominated by noise).

In step S106, the control model is adjusted based on the relationships determined in steps S104 and S105. This adjustment may comprise:
  adding new secondary sensors 20 to the control model if a correlation has been found between those secondary sensors 20 and the primary 10 or secondary 20 sensors already in the control model and/or the plasma control inputs 30
  adjusting weightings of primary sensors 10 and/or secondary sensors 20 within the control model to reflect the determined relationships;
  removing failed primary sensors 10 from the control model if it is determined that no useful correlation exists between their readings and the plasma state.

In step S107, if the reactor is operating in a training mode, then a decision is taken as to whether to begin full operation. The decision may be based on the time the reactor has spent in the training mode and/or in a accuracy or confidence level of the control model. In the case that a decision is made to exit the training mode, the controller issues commands to cause the reactor to move to full operation (S108).

Following steps S107 and S108, or immediately following step S106 if the reactor is not in the training mode, the controller proceeds back to step S103, and controls the plasma using the adjusted control model.

The above exemplary algorithm allows the controller to adapt to optimise the state of the plasma and ensure good reactor performance, and to continue to control the plasma even after the failure of some or all of the primary sensors 10.

While the above description has been directed to a generic nuclear fusion reactor incorporating a plasma chamber, it is considered to be particularly suitable to a spherical tokamak, as the reduced space in such a device means that there is less ability to provide redundant sensors. Furthermore, spherical tokamaks are likely to be particularly sensitive to small errors in the design or control schemes which would potentially be within acceptable operating parameters for a conventional tokamak or other fusion reactor.

The invention claimed is:

1. A method of controlling a plasma within a plasma vessel of a nuclear fusion reactor, the nuclear fusion reactor including one or more plasma control inputs, one or more primary sensors and one or more secondary sensors, and wherein the plasma control inputs are configured to adjust the properties of the plasma, the method comprising:
   providing an initial control model relating readings of only the one or more primary sensors to control of the plasma control inputs;
   performing a control loop including:
      controlling the plasma using the one or more plasma control inputs in dependence upon the one or more primary sensors and/or one or more secondary sensors according to the control model;
      determining, using a machine learning algorithm, correlations between readings of the one or more secondary sensors and readings of the one or more primary sensors, and/or between readings of the one or more secondary sensors and states of the one or more plasma control inputs; and
      adjusting the control model based on the correlations determined by the machine learning algorithm, wherein adjusting the control model includes adding a secondary sensor to the control model when a correlation has been found between readings of the one or more secondary sensors and readings of one or more primary sensors, and/or between readings of the one or more secondary sensors and states of the one or more plasma control inputs, and
      controlling the plasma according to the adjusted control model;
      wherein the one or more plasma control inputs control external heating and current drive, position control coils, fueling systems, and disruption control systems, the one or more primary sensors monitor the plasma and the one or more secondary sensors monitor aspects of the reactor other than the plasma.

2. The method according to claim 1, wherein adjusting the control model includes one or more of:
   adjusting weightings of one or more primary sensors and/or one or more secondary sensors within the control model on the basis of the determined correlations, and
   removing one or more primary sensors and/or one or more secondary sensors from the control model if it is determined that there is no longer sufficient correlation between that sensor and other primary sensors or secondary sensors and/or the plasma control inputs.

3. The method according to claim 1, wherein the primary sensors comprise any one or more of:
   magnetic diagnostics;
   spectroscopic instruments;
   optical sensors;
   bolometric systems;
   microwave diagnostics.

4. The method according to claim 1, wherein the secondary sensors comprise any one or more of:
   stress sensors;
   strain sensors;
   microphones;
   vibration sensors;
   temperature sensors; and
   neutron detectors.

5. The method according to claim 1, wherein the plasma control inputs comprise any one or more of:
   magnetic field coils;
   poloidal field coils;
   toroidal field coils;
   a heating system;
   a current drive system; and
   a fuel input.

6. The method according to claim 1, wherein the nuclear fusion reactor is a spherical tokamak.

7. A controller for a nuclear fusion reactor, the controller being configured to interface with sensors and plasma control inputs of the nuclear fusion reactor, and to perform a method according to claim 1.

8. A non-transitory computer-readable medium storing instructions that, when executed by a controller for a nuclear fusion reactor, cause the controller to perform a method according to claim 1.

9. The method according to claim 1, wherein the one or more secondary sensors are configured to monitor at least one selected from the group consisting of structural stresses, structural strains, temperature of a superconducting magnet, noise, and neutron flux.

10. The method according to claim 1, further comprising initialising the reactor in a low neutron production mode, and switching to a power generation mode following a training period.

11. The method according to claim 10, wherein the training period finishes:
   after a predetermined time has elapsed; or
   when a given accuracy and/or confidence level of the control model has been achieved.

12. A method of controlling a position, temperature and/or current of a plasma within a plasma vessel of a nuclear fusion reactor, the nuclear fusion reactor including sensors and plasma control inputs, wherein the sensors include one or more primary sensors and one or more secondary sensors, and wherein the plasma control inputs are configured to adjust the properties of the plasma, the method comprising:
   providing an initial control model relating readings of only the one or more primary sensors to control of the plasma control inputs; and
   performing a control loop including:
      controlling the position, temperature, current, density and/or shape of the plasma using the plasma control inputs in dependence upon the one or more primary and/or one or more secondary sensors according to the control model,
      determining, using a machine learning algorithm, correlations between readings of the one or more secondary sensors and readings of the one or more primary sensors, and/or between readings of the one or more secondary sensors and states of the plasma control inputs,
      adjusting the control model based on the correlations determined by the machine learning algorithm, wherein adjusting the control model includes adding a secondary sensor to the control model when a correlation has been found between readings of the one or more secondary sensor and readings of the one or more primary sensors and/or between readings of the one or more secondary sensors and states of the plasma control inputs, and controlling the position, temperature and/or current of the plasma based on the adjusted control model;

wherein the one or more plasma control inputs control external heating and current drive, position control coils, fueling systems, and disruption control systems, the one or more primary sensors monitor the plasma and the one or more secondary sensors monitor aspects of the reactor other than the plasma.

* * * * *